United States Patent
Spahn

(10) Patent No.: US 7,881,555 B2
(45) Date of Patent: Feb. 1, 2011

(54) METHODS AND SYSTEMS FOR REDUCING BRIGHT BURN IN IMAGES

(75) Inventor: Martin Spahn, Chicago, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1060 days.

(21) Appl. No.: 11/580,368

(22) Filed: Oct. 13, 2006

(65) Prior Publication Data
US 2008/0056608 A1    Mar. 6, 2008

Related U.S. Application Data

(60) Provisional application No. 60/840,765, filed on Aug. 29, 2006.

(51) Int. Cl.
| G06K 9/40 | (2006.01) |
| G06K 9/00 | (2006.01) |
| G09G 1/14 | (2006.01) |
| H04N 1/40 | (2006.01) |

(52) U.S. Cl. .............. 382/274; 382/128; 382/168; 382/275; 345/20; 358/3.01

(58) Field of Classification Search .......... 382/128, 382/275
See application file for complete search history.

(56) References Cited

U.S. PATENT DOCUMENTS

| 4,868,843 | A | * | 9/1989 | Nunan | 378/152 |
| 5,200,986 | A | * | 4/1993 | Schlie | 378/156 |
| 5,351,306 | A | * | 9/1994 | Finkler et al. | 382/169 |
| 5,434,903 | A | * | 7/1995 | Hoornaert et al. | 378/116 |
| 5,574,764 | A | * | 11/1996 | Granfors et al. | 378/98.7 |
| 6,208,708 | B1 | | 3/2001 | Hoheisel et al. | |
| 6,429,414 | B1 | | 8/2002 | Spahn | |
| 6,477,228 | B2 | | 11/2002 | Spahn | |
| 6,546,124 | B1 | * | 4/2003 | Hopple et al. | 382/132 |
| 6,655,836 | B2 | | 12/2003 | Boehm et al. | |
| 6,707,881 | B2 | | 3/2004 | Boehm et al. | |
| 6,718,011 | B2 | | 4/2004 | Spahn | |
| 6,763,084 | B2 | | 7/2004 | Boehm et al. | |
| 6,768,784 | B1 | * | 7/2004 | Green et al. | 378/62 |
| 6,859,521 | B2 | | 2/2005 | Spahn | |

(Continued)

OTHER PUBLICATIONS

"Motion Detection Algorithm" by Andrew Kirillov; posted Apr. 30, 2005.

(Continued)

*Primary Examiner*—Matthew C Bella
*Assistant Examiner*—Jose M Torres

(57) ABSTRACT

A system and method to reduce bright burn in images, such as x-ray images. The reduction of bright burn may be accomplished by processing a received raw image to obtain a grey-value histogram. The raw image may be divided into a plurality of regions of interest, and an average signal of each region of interest is calculated. Regions of interest are identified as bright burn candidates based on a predetermined function of the average signal of each region of interest and the grey-value histogram of the entire raw image. The regions of interest may be analyzed for local connectivity to estimate bright burn areas. An image with reduced bright burn is generated by either automatically adjusting a physical wedge filter position based on the bright burn areas, or by adaptively reducing a signal level of the bright burn areas.

29 Claims, 7 Drawing Sheets

U.S. PATENT DOCUMENTS

| | | | |
|---|---|---|---|
| 6,912,266 | B2 | 6/2005 | Spahn |
| 6,954,514 | B2 | 10/2005 | Wischmann et al. |
| 7,027,558 | B2 | 4/2006 | Ghelmansarai et al. |
| 7,046,757 | B1 | 5/2006 | Bani-Hashemi et al. |
| 7,056,018 | B2 | 6/2006 | Stierstorfer et al. |
| 7,073,939 | B2 | 7/2006 | Spahn |
| 7,075,061 | B2 | 7/2006 | Spahn |
| 7,076,023 | B2 | 7/2006 | Ghelmansarai et al. |
| 7,113,648 | B1* | 9/2006 | Aihara ................. 382/274 |
| 7,298,897 | B1* | 11/2007 | Dominguez et al. ......... 382/172 |
| 7,336,849 | B2* | 2/2008 | Wu ..................... 382/274 |
| 2002/0150214 | A1 | 10/2002 | Spahn |
| 2005/0161610 | A1 | 7/2005 | Spahn |
| 2005/0218296 | A1 | 10/2005 | Spahn |
| 2006/0001601 | A1 | 1/2006 | Ono |
| 2006/0133658 | A1 | 6/2006 | Spahn |
| 2006/0164524 | A1* | 7/2006 | Shibano et al. ............ 348/234 |
| 2006/0188063 | A1 | 8/2006 | Spahn |

OTHER PUBLICATIONS

"A quantitative comparison of motion detection algorithms in fMRI" by Babak A. Ardelconi et al.; received Apr. 11, 2001; accepted Jun. 17, 2001.

"Retrospective Motion Correction in Digital Subtraction Angiography: A Review" by Erik H. W. Meijering, et al.; IEEE Transactions on Medical Imaging, vol. 18, No. 1, Jan. 1999, pp. 2-21.

"Motion Detection for Adaptive Spatio-Temporal Filtering of Medical X-Ray Image Sequences" by Marc Hensel, et al.; 2005 Springer. In: H.-P. Meinzer, et al. (Edt.): *Bildverarbaiteng für die Meditata 2005: Algorithms, Systems, Anwandangen*, Springer, 2005 (ISBN 3-540-25052-2). Proceedings BVM 2005, Heidelberg, Germany, Mar. 13-15, 2005.

"A 3-D space-time motion detection for an invariant image registration approach in dig angiography" vol. 97, Issue 1 (Jan. 2005).

"Evaluating Motion Detection Algorithms: Issues and Results" by J. Renno, et al.

"Motion Detection and Recognition Research" by Randal C. Nelsonard, et al.

"A Robust and Computationally efficient motion detection algorithm based on background estimation" by A. Manzenero, et al.

Chapter 10. "Controlling Frame Rate" Part II. Programming with OpenGL Performer.

Gert Schoonenberg et al. "Adaptive spatial-temporal filtering applied to x-ray fluoroscopy angiography", Proceedings of SPIE, Medical Imaging, vol. 5744, pp. 870-878, 2005.

* cited by examiner

METHODS AND SYSTEMS FOR REDUCING BRIGHT BURN IN IMAGES

CROSS-REFERENCE TO RELATED APPLICATIONS

This application claims a priority benefit to provisional application Ser. No. 60/840,765, filed on Aug. 29, 2006 and entitled "Image Analysis Controlled Bright Burn Reduction," which is hereby incorporated by reference in its entirety herein.

BACKGROUND

1. Field of the Invention

The present invention relates generally to x-ray imaging systems, for example, cardiac or peripheral angiographic systems. More particularly, the present invention is directed to a method and system for reducing bright burn in x-ray images.

2. Background Discussion

Radiography is the use of certain spectra of electromagnetic radiation, usually x-rays, to image a human body. Angiography, a particular radiographic method, is the study of blood vessels using x-rays. An angiogram uses a radiopaque substance, or contrast medium, to make the blood vessels visible under x-ray. Angiography is used to detect abnormalities, including narrowing (stenosis) or blockages (occlusions), in the blood vessels throughout the circulatory system and in certain organs.

Cardiac angiography, also known as coronary angiography, is a type of angiographic procedure in which the contrast medium is injected into one of the arteries of the heart, in order to view blood flow through the heart, and to detect obstruction in the coronary arteries, which can lead to a heart attack.

Peripheral angiography, in contrast, is an examination of the peripheral arteries in the body; that is, arteries other than the coronary arteries. The peripheral arteries typically supply blood to the brain, the kidneys, and the legs. Peripheral angiograms are most often performed in order to examine the arteries which supply blood to the head and neck, or the abdomen and legs.

A drawback in cardiac, and especially peripheral, angiography, and considered a nuisance by physicians, is bright image artifacts, such as spurious images, unintended splotches, and other aberrant perturbations that appear on the x-ray image. The term "bright burn" is often used to refer to an image artifact in which a particular region of an image appears relatively bright. Bright burn can greatly diminish the quality of imaging in areas with little or no x-ray absorption, such as the lung area or the legs. The low x-ray absorption generates very high signals, and hence bright areas, which can distract the physician, or technician, from his or her diagnostic or interventional procedure.

Several areas of the body are particularly problematic to image degradation because of bright burn. For example, imagining the lung area, the legs, or any portion of the human body with large areas of empty space, can generate images with areas with significant bright burn.

Conventional attempts to solve the problems associated with bright burn include manually moving wedge-shaped filters into areas of bright burn to partially block x-ray radiation, or using dynamic range compression algorithms on the raw image data to reduce bright burn.

Both of these solutions have drawbacks. For example, the process of manually moving wedge filters hampers and impedes an operator's workflow. Additionally, after a change of angulation, the wedge filter may no longer be necessary; if the operator forgets to take the filter out of the x-ray beam, the filter will actually diminish image quality.

Furthermore, a drawback to dynamic range compression algorithms is that they require very high compression ratios to effectively compensate for bright burn artifacts. Since such algorithms are not discriminative, but operate on the entire image, actual areas of interest (for example, the arteries in the heart or the legs, and the surrounding anatomy) may be altered in undesired ways.

Thus, conventional x-ray images may suffer from bright burn areas that degrade the image quality and impede the ability to easily comprehend the contents of the x-ray images.

Therefore, it would be an advancement in the state of the art to provide systems and methods that reduce bright burn in x-ray images.

SUMMARY

The present invention provides methods and systems to reduce bright burn in images, such as images produced by x-rays.

Accordingly, one embodiment of the present invention is directed to a method for reducing bright burn in an image. The method includes accessing image data and determining a grey value distribution of the image data. One or more regions of the image data are identified and a magnitude of an average signal for each of the regions is determined. One or more of the regions are identified as bright burn regions based on the magnitude of the average signal of each region and a predetermined function of the grey value distribution of the image data. Bright burn in the bright burn regions is then reduced.

Another embodiment of the present invention is directed to the method described above, (hereinafter, "the method") that also includes evaluating a value of the predetermined function of the grey value distribution and comparing the magnitude of the average signal of each region to the value of the predetermined function of the grey value distribution. One or more of the regions are identified as bright burn regions when the magnitude of the average signal of a region exceeds the value of the predetermined function of the grey value distribution of the image data.

Yet another embodiment of the present invention is directed to the method wherein the predetermined function is a predetermined number multiplied by approximately one-half of a median value of the grey value distribution.

Yet another embodiment of the present invention is directed to the method wherein the predetermined function is the greater of approximately 0.80 of a median of the grey value distribution and a predetermined number multiplied by a median value of the grey value distribution.

Yet another embodiment of the present invention is directed to the method wherein the predetermined function is a predetermined percentage of a dynamic range of the grey value distribution.

Yet another embodiment of the present invention is directed to the method that also includes determining whether one or more bright burn regions are locally connected and establishing an aggregate bright burn area as a function of locally connected bright burn regions. Bright burn is then reduced in the aggregate bright burn area.

Yet another embodiment of the present invention is directed to the method wherein the reducing also includes moving a wedge filter into the aggregate bright burn area.

Yet another embodiment of the present invention is directed to the method wherein the reducing step includes adjusting a filter position as a function of the aggregate bright burn area.

Yet another embodiment of the present invention is directed to the method wherein the adjusting step is performed independent of intervention of a human operator.

Yet another embodiment of the present invention is directed to the method wherein the reducing also includes subtracting signal content in an adaptive manner from the one or more bright burn regions.

Yet another embodiment of the present invention is directed to the method wherein the subtracting includes subtracting a large kernel low pass filter from the one or more bright burn regions.

Yet another embodiment of the present invention is directed to the method wherein the grey value distribution is a histogram.

Yet another embodiment of the present invention is directed to the method wherein one or more regions of the image data and one or more bright burn regions are connected subsets of pixels of the entire image.

Yet another embodiment of the present invention is directed to the method that also includes accessing the image data from an x-ray detector.

Other embodiments of the present invention include the methods described above implemented using apparatus or programmed as computer code to be executed by one or more processors operating in conjunction with one or more electronic storage media.

BRIEF DESCRIPTION OF THE DRAWINGS

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following description of the invention when considered in conjunction with the drawings. The following description, given by way of example, but not intended to limit the invention solely to the specific embodiments described, may best be understood in conjunction with the accompanying drawings, in which.

DETAILED DESCRIPTION

Figure 1:
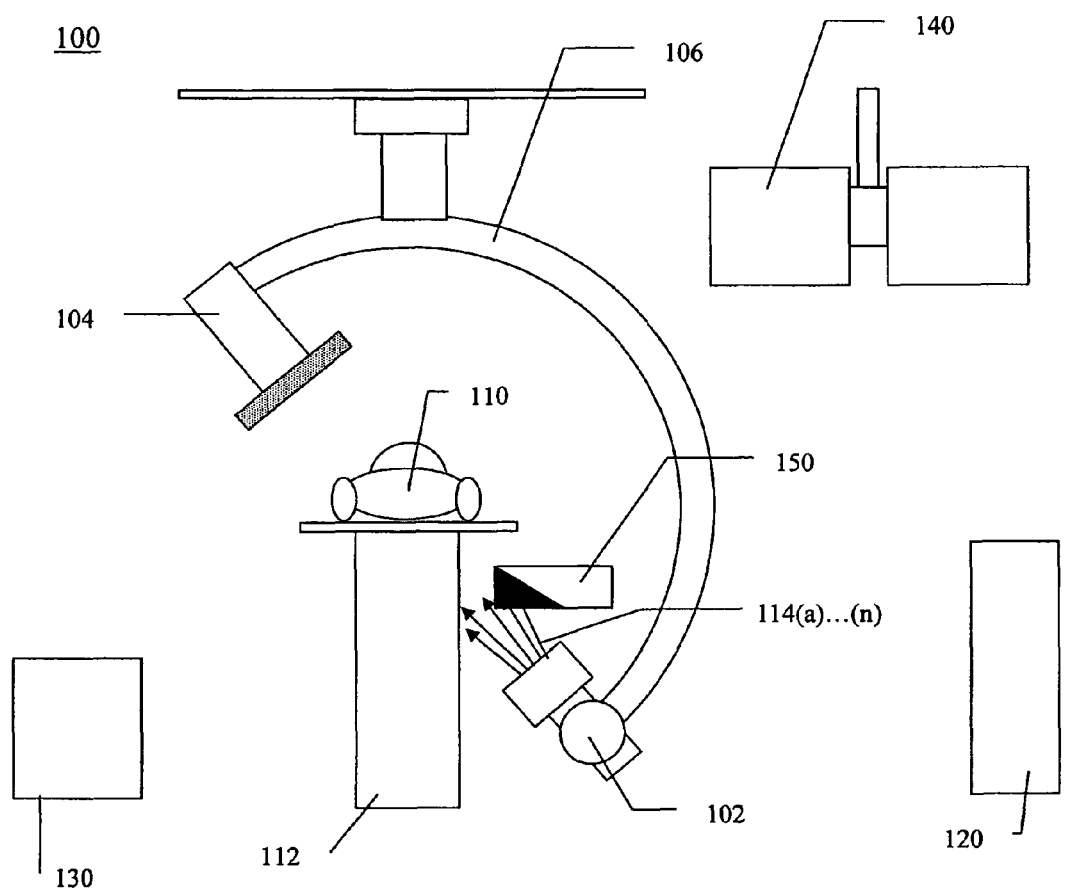
FIG. 1 shows an example of an x-ray system according to one embodiment of the present invention.

It is noted that in this disclosure and particularly in the claims and/or paragraphs, terms such as "comprises," "comprised," "comprising," and the like can have the meaning attributed to it in U.S. patent law; that is, they can mean "includes," "included," "including," and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. These and other embodiments are disclosed or are apparent from and encompassed by, the following description. As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

A detailed description of radiography, angiography, and x-ray imaging systems may be found in the following treatises:

Baum, Stanley and Michael J. Pentecost, eds. *Abram's Angiography*, 4$^{th}$ ed. Philadelphia: Lippincott-Raven, 1996, which is hereby incorporated by reference in its entirety herein;

Jeanne, LaBergem, ed. *Interventional Radiology Essentials*, 1$^{st}$ ed. Philadelphia: Lippincott Williams & Wilkins, 2000, which is hereby incorporated by reference in its entirety herein; and Johns, Harold E. and John R. Cunningham. *Physics of Radiology*, 4$^{th}$ ed. Charles C. Thomas Publisher Ltd., 1983, which is hereby incorporated by reference in its entirety herein.

In order to overcome the above-described drawbacks related to undesired bright burn in image data (such as bright image artifacts, spurious images, unintended splotches, and other aberrant perturbations that appear on the x-ray image), the present invention provides a system and method to reduce bright burn.

The content of x-ray images is used to determine areas subject to bright burn. The bright burn is then reduced by either moving x-ray filters into these areas, or manipulating the image data. The reduction of bright burn may be accomplished by processing a received raw image to obtain a grey-value histogram. The raw image may be divided into a plurality of regions of interest, and an average signal of each region of interest is calculated. Regions of interest are identified as bright burn candidates based on the average signal of each region of interest and a predetermined function the grey-value histogram of the entire raw image.

The regions of interest may be identified, or marked, as bright burn candidates, which is followed by local connectivity analysis to estimate bright burn areas. An image with reduced bright burn is generated by either automatically adjusting a physical wedge filter position based on the bright burn areas, or adaptively reducing a signal level of the bright burn areas via image processing.

Thus, embodiments of the present invention are directed to image analysis performed on raw image data to locate bright burn areas, and then the bright burn is reduced either by (1) automatically moving physical wedge filters into the bright burn areas, or by (2) performing image manipulation to reduce the average signal value in the bright burn areas.

Physical wedge filters may be moved into the area automatically, and removed automatically when not needed. This has the advantage that the signal (in the otherwise bright burn area) may be reduced to a level that is within the dynamic range of the X-ray detector.

A "software wedge filter" may be used to reduce the average signal gradually from the well imaged area(s) to the bright burn area(s). This has the advantage that shapes other than polygons may be used to circumscribe the bright burn area.

Also, software wedge filters act on the image data in real-time, thereby reducing time lag in comparison with moving physical wedge filters.

According to an embodiment of the invention, to identify bright burn areas, the image is analyzed for connected areas of reasonable size with a high average grey value signal. The boundary of this area (or areas) is determined, and used as input for bright burn reduction, either by the physical wedge filter or by image correction ("software wedge filter").

In one embodiment of the invention, the results of the image analysis may be compared with the probability that the procedure under consideration produces bright burn effects. This approach could be used to validate the estimates of bright burn areas. For example, a higher probability is assigned to procedures which are known to generate bright burn (for example, cardiac procedures or peripheral angiography). The probability may also be selected based on the organ-specific procedures prior to an exam which relate to a procedure which is more likely to produce bright burn. For example, a "combo lab" (a lab having more than one detector) may have a selection option for cardiac procedures. Finally, the probability may be determined as a function of the angulation and position of the x-ray tube and detector with respect to the nominal patient location, as an indicator for bright burn. For example, a position at the end of the table (near the feet) is known to generate bright burn to a higher degree.

FIG. 1 shows an example of an x-ray angiography system 100 according to one embodiment of the present invention. This embodiment includes automated and adaptive bright burn reduction using a physical wedge filter. However, in embodiments in which image correction is used, the physical wedge filter is not necessary.

According to an embodiment of the invention, illustrated in FIG. 1, a patient 110 is placed on a table 112. A support member, such as a C-arm, 106 supports an x-ray emitting unit, such as an x-ray tube, 102 and an x-ray detecting unit, such as an x-ray detector, 104. The x-ray emitting unit 102 is adapted to emit x-rays 114(a) . . . (n) (where "n" identifies a plurality of x-ray signals), and the x-ray detecting unit 104 is adapted to absorb and measure the emitted x-rays. A physical wedge filter 150 is disposed in the path of x-rays 114. Images of all or parts of the patient 110 may be obtained using the x-ray emitter 102, x-ray detector 104, and the x-rays 114. The images typically assist in the diagnosis and/or treatment of the patient 110.

A generator unit 120 is used to generate the x-rays emitted by the x-ray emitting unit 102. The x-ray generator 120 is typically, for example, an x-ray producing device that includes a source of electrons, a vacuum within which the electrons are accelerated, and an energy source that causes the electrons to be accelerated.

A system control unit and imaging system 130 controls the operation of the entire system 100, performs image processing, and transmits the image data for display on the image display unit 140. The system control and imagining system 130 includes a processor and memory modules.

The display unit 140 is used to display the image data generated by the system 100. This display unit 140 may be, for example, a monitor, LCD (liquid crystal display), a plasma screen, or other module adapted to display output data typically by a representation of pixels.

As shown in FIG. 1, the wedge filter 150 is automatically and adaptively positioned in the path of the x-ray beam, or x-ray signals, 114(a) . . . (n) (where "n" indicates plural signals) to adaptively minimize bright burn areas. The system control and imagining system 130 controls a position of the physical wedge filter 150 as a function of the estimated bright burn areas based on image analysis of the raw image data from the x-ray detector unit 104. As stated previously, if image correction is used (image correction is described in relation to FIG. 4), the physical wedge filter 150 is not necessary.

Figure 2:
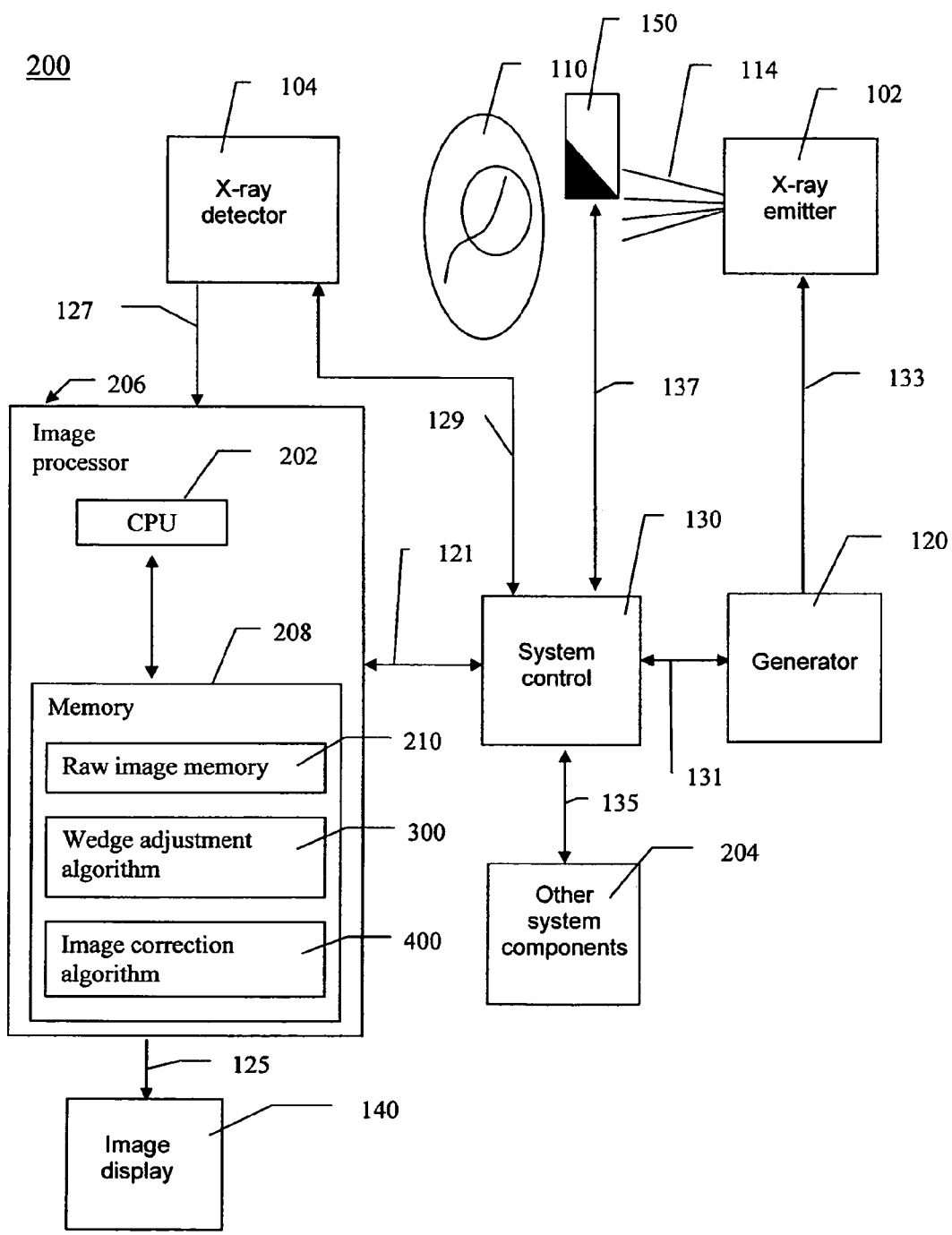
FIG. 2 shows a block diagram of an example of an imaging system that reduces bright burn.

FIG. 2 shows a block diagram 200 of an example of an x-ray angiography system. As shown in FIG. 2, x-rays 114 are emitted from an x-ray emitting apparatus, such as an x-ray tube, 102 and directed toward a patient 110. X-rays are detected by x-ray detecting apparatus 104. The detected x-ray signals are transmitted, via transmission medium 127, which is typically a wire connection, communication bus, such as an IEEE bus, or other data transmission medium suitable to transmit data signals or pulses that represent the output from x-ray detector 104, to an image processing module 206. The image processing module 206 (described in more detail below) is in bi-directional communication, via transmission medium 121, with system control unit 130 (described in more detail below) and is in communication with image display unit 140, via transmission medium 125.

The image processor 206 stores and processes the detected data, received from detector unit 104, and provides the output to system control unit 130, which is in bi-directional communication, via transmission medium 135, with other system components 204. The system control unit 130 provides control signals to adjust, if necessary, a position of the physical wedge filter 150, via transmission medium 137. The system control unit 130 also provides control signals to generator unit 120, via transmission medium 131. The generator unit 120 adjusts, if necessary, the x-rays emitted by x-ray emitting unit 102 via transmission medium 133. The system-control unit 130 provides control signals to x-ray detector 104, via transmission medium 129.

The image processing module 206 includes a central processing unit (CPU) 202, which is in bi-directional communication with memory module 208.

The CPU 202 is typically a processor that includes an arithmetic logic unit (ALU), which performs arithmetic and logical operations, and a control unit (CU), which extracts instructions from memory and decodes and executes them, utilizing the ALU when necessary.

The memory module 208 includes image memory module 210, wedge adjustment algorithm module 300, and image correction algorithm module 400.

Image memory module, or facility, 210 is used to store image data either received from the detecting unit 104 or generated by the CPU 202 of the image processor 206, based on emitted and detected x-rays from x-ray detecting unit 104. The image memory module 210 is typically an electronic storage medium adapted to store received data in electronic form and may be solid state storage, such as random access memory (RAM) or cache memory. It may also include recorders to record to and read from mass storage devices such as, for example, optical disks, magnetic disks, flash semiconductor disks, and other types of storage which may be temporary or permanent. The image memory 210 may be accessed in such as way that the contents of the memory are provided to the CPU 202 and/or system controller 130. Once the data has been accessed, typically by program code to fetch, or retrieve, the desired data stored in memory, it may be processed according to one or more algorithms described here.

The system control unit 130 controls the position of the physical wedge filter 150 via control line 137 as a function of the estimated bright burn areas based on image analysis performed by the image processor unit 206.

Memory module 300 is typically an electronic storage medium that stores a wedge filter adjustment algorithm, which is a series of steps to adjust, or modify, the position of a wedge filter (shown as element 150 in FIG. 1). The wedge filter adjustment algorithm may be executed by the CPU 202, and the output of the execution of the wedge filter adjustment algorithm is typically provided to the system control module 130. The wedge filter adjustment algorithm is described in more detail with relation to FIG. 3.

Memory module 400 is typically an electronic storage medium that stores an image correction algorithm, which is a series of steps to identify and reduce bright burn portions of an image. The image correction algorithm may be executed by the CPU 202 and the output of the execution of the image correction algorithm is typically provided to the system control module 130. The image correction algorithm is described in more detail with relation to FIG. 4.

The output from the image processing module 206 is provided to image display module 140, via transmission medium 125. The output is typically an image with reduced bright burn that is more easily read and understood by a physician, technician, or other operator. The image display module 140 is typically a monitor, LCD (liquid crystal display), a plasma screen, or other graphical user interface that can display output data. Also, the image display module 140 may be coupled to another CPU, processor, or computer, such as a desktop computer, or a laptop computer (not shown), and may also be coupled to a keyboard, a mouse, a track ball, or other input device (not shown) to adjust the view, dimensions, color, font, or display characteristics. The image processing module 206 may also be coupled to a printer (not shown) to print the output, or a transmission module, such as a DSL line (not shown) or a modem, such as a wireless modem (not shown), to transmit the output to a second location or another display module. This transmission may also be accomplished using a network, such as the Internet, with web browsing capability, or other network of operatively coupled computers, processors, or output devices.

Figure 3:
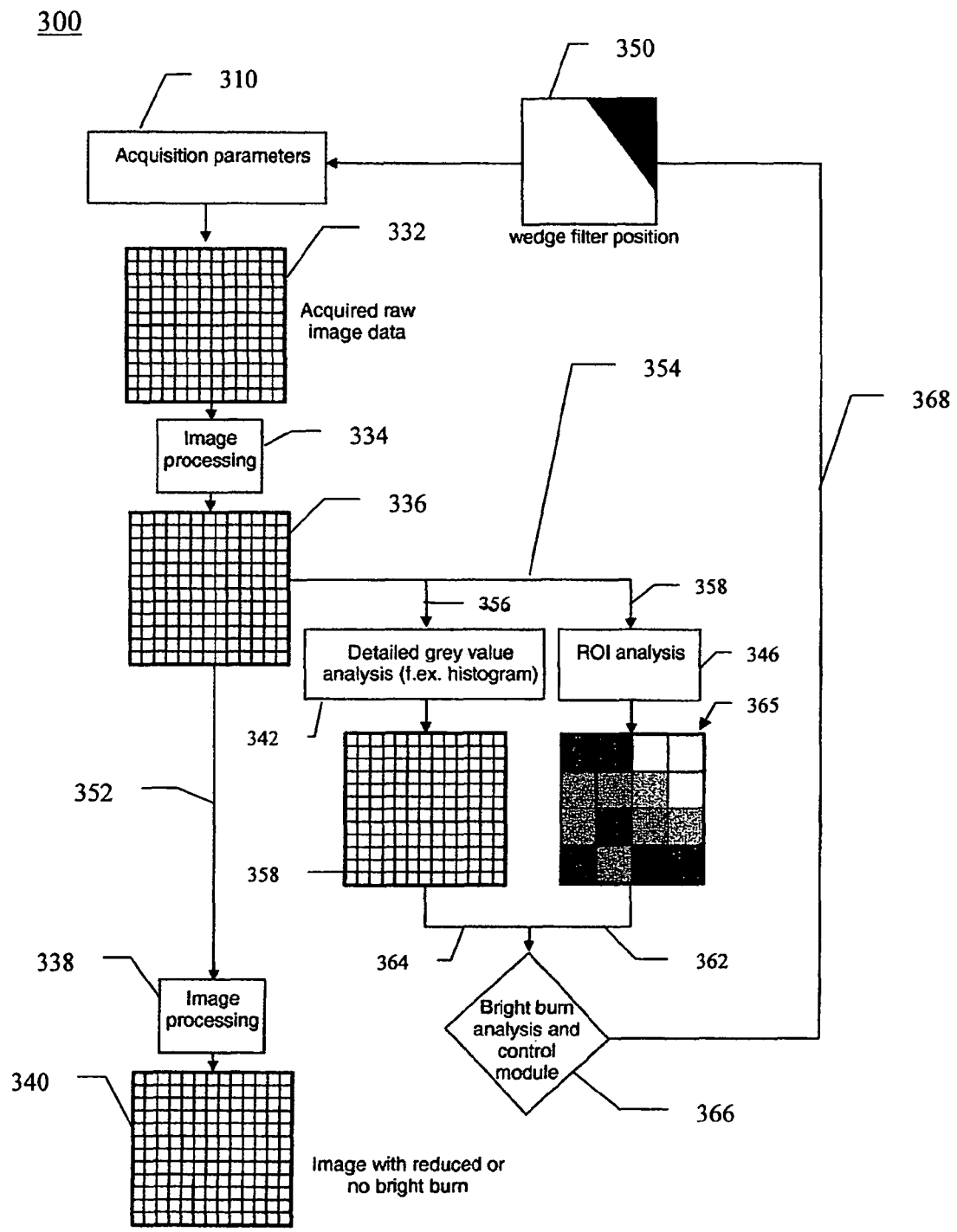
FIG. 3 shows an embodiment of the system control of the present invention to reduce bright burn by adjusting a wedge filter position.

FIG. 3 shows a diagram 300 of steps and image data, which may be stored on a computer-readable medium. The embodiment shown in FIG. 3 is directed to adjusting a wedge filter position. The steps may be executed by a processor, or otherwise executed to perform the identified functions. For example, the steps of FIG. 3 may be stored on a computer-readable medium, such as ROM, RAM, EEPROM, CD, DVD, or other non-volatile memory.

Acquisition parameters, such as frame rate and pulse length, are acquired and stored in step 310. (This data may be stored in a memory, such as image data memory 210 shown in FIG. 2.) Acquired raw image data 332 may be, for example, raw image data acquired from the x-ray detector unit (shown as element 104 in FIG. 1). Image pre-processing, shown as step 334, is typically performed on the image data 332 obtained from the x-ray detector unit to generate pre-processed image data 336. A detailed grey-value analysis is performed on the entire image, as shown by step 342. (Step 342 is reached via lines 354 and 356, shown in FIG. 3). For example, a histogram of the entire image, shown as element 358, may be generated, or calculated.

Figure 6:
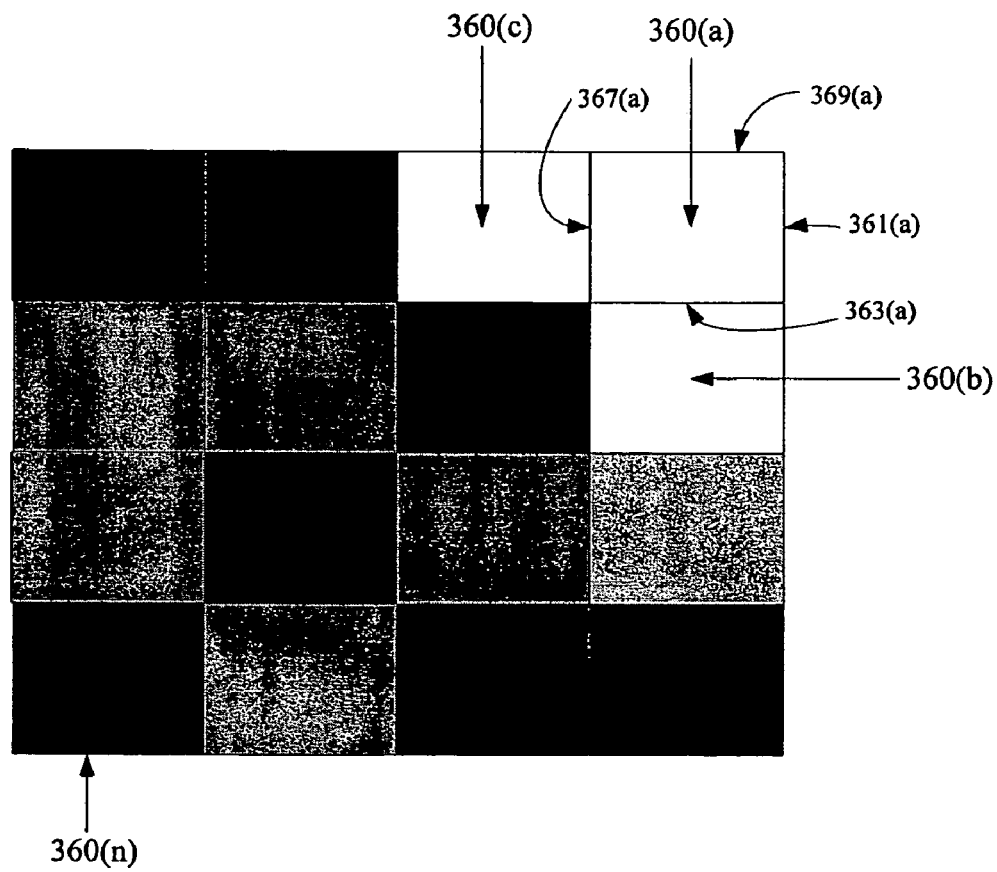
FIG. 6 illustrates an example of an image divided into one or more regions of interest.

Region of Interest (ROI) analysis is performed, as shown by step 346, (reached by lines 354 and 358), to locate regions of high signal value. In order to identify bright burn areas, the image, identified generally as 365, is analyzed for connected areas of reasonable size with a high average grey value signal. That is, as shown in FIG. 6, the image is subdivided into several smaller areas 360(a) . . . (n) (where "n" is the number of ROIs), and the average signal is determined within these ROI areas 360 (a) . . . (n). (The aggregate image, including the ROIs 360(a) . . . (n), is shown generally as element 365.)

Lines 362 and 364 lead to processing step 366, which performs bright burn analysis and generates a control signal to adjust the position of the wedge filter (shown as element 150 in FIG. 1).

FIG. 6 shows an enlarged view of image 365. Each ROI area 360(a) . . . (n) (where "n" is the number of ROIs) has corresponding boundaries that identify, or demarcate, the dimensions of the ROI. Specifically, ROIs 360(a), 360(b), 360(c), and 360(n) are identified. For example, ROI 360(a) has boundaries 361(a), 363(a), 367(a), and 369(a). The processing performed by step 366 of FIG. 3 includes determining the ROI area 360(a) and utilizing the boundary of the ROIs to adjust the position of the physical wedge filter (element 150 in FIG. 1). Also, processing step 366 of FIG. 3 compares the average signal of each ROI (regions 360(a) . . . (n)) to the grey value distribution of the whole image (histogram 358). If the ROI qualifies as a bright burn candidate ("BBC"), it will be so marked, or otherwise identified accordingly.

The qualification as a BBC may be based on the average signal of the ROI exceeding a predetermined brightness threshold, or based on another suitable technique. For example, an ROI may be marked as a bright burn candidate (BBC) if:

the average signal of the ROI is higher than a predetermined multiple (rational or integer) times a mean of the histogram;

the average signal of the ROI is higher than a predetermined multiple (rational or integer) times a 50% median of the histogram;

the average signal of the ROI is higher than an 80% median of the histogram and higher than a predetermined number times the 50% median of the histogram; or the average signal of the ROI is higher than a fixed threshold in the unprocessed raw data of the detector (for example, higher than a predetermined percentage of the dynamic range of the detector).

Image analysis may be done prior to grey value processing (such as grey value re-mapping, dynamic range compression, and other image processing techniques), or it may be done after such image processing steps.

In FIG. 3, the ROIs (shown generally as 360) that have been identified, or marked, as bright burn candidates (BBCs) (specifically 360(a), 360(b) and 360(c) are BBCs; 360(n) is not a BBC) are then analyzed to determine if they are connected locally. In order to be connected locally, the BBCs must be sufficiently close in proximity. For example, all BBC that are less than a predetermined distance from each other are considered connected. If several ROIs are connected, forming a larger area, and if these areas are consistent with several predefined, expected shapes of bright burn areas, the connected ROIs will be determined to be bright burn areas, and will be subject to bright burn reduction by moving the physical wedge into the area defined by the connected ROIs in step 350, which is reached by line 368.

As shown in FIG. 3, ROIs 360(a), 360(b), and 360(c) are locally connected and form a bright burn area. The wedge filter is positioned, as shown in step 350, to cover the bright burn area corresponding to ROIs 360(*a*), 360(*b*), and 360(*c*).

Further image processing may be performed in step 338 to produce final image data 340 with bright burn substantially reduced or totally eliminated. This further image processing is performed after the wedge filter (element 150 in FIG. 1) has been placed over the bright burn area 360(*a*), 360(*b*), and 360(*c*) (shown as step 350 in FIG. 3).

Line 352 shows that the output image data 340 may be generated after one or more grey value analyses (342), ROI analysis (346), bright burn analysis (366), and wedge filter adjustments (350) have been performed. Thus, the wedge filer adjustment may be an iterative process.

It is also an embodiment of the present invention that the individual BBCs may determine wedge filter position without regard to the connectivity of one or more BBCs.

In the embodiment with a physical wedge filter, moving (and removing when not needed) the physical wedge filters into the bright burn area(s) is accomplished automatically without an intervention of a human operator. This has the advantage that the signal (in the otherwise bright burn areas) may be reduced to a level that is within the dynamic range of the x-ray detector.

Figure 4:
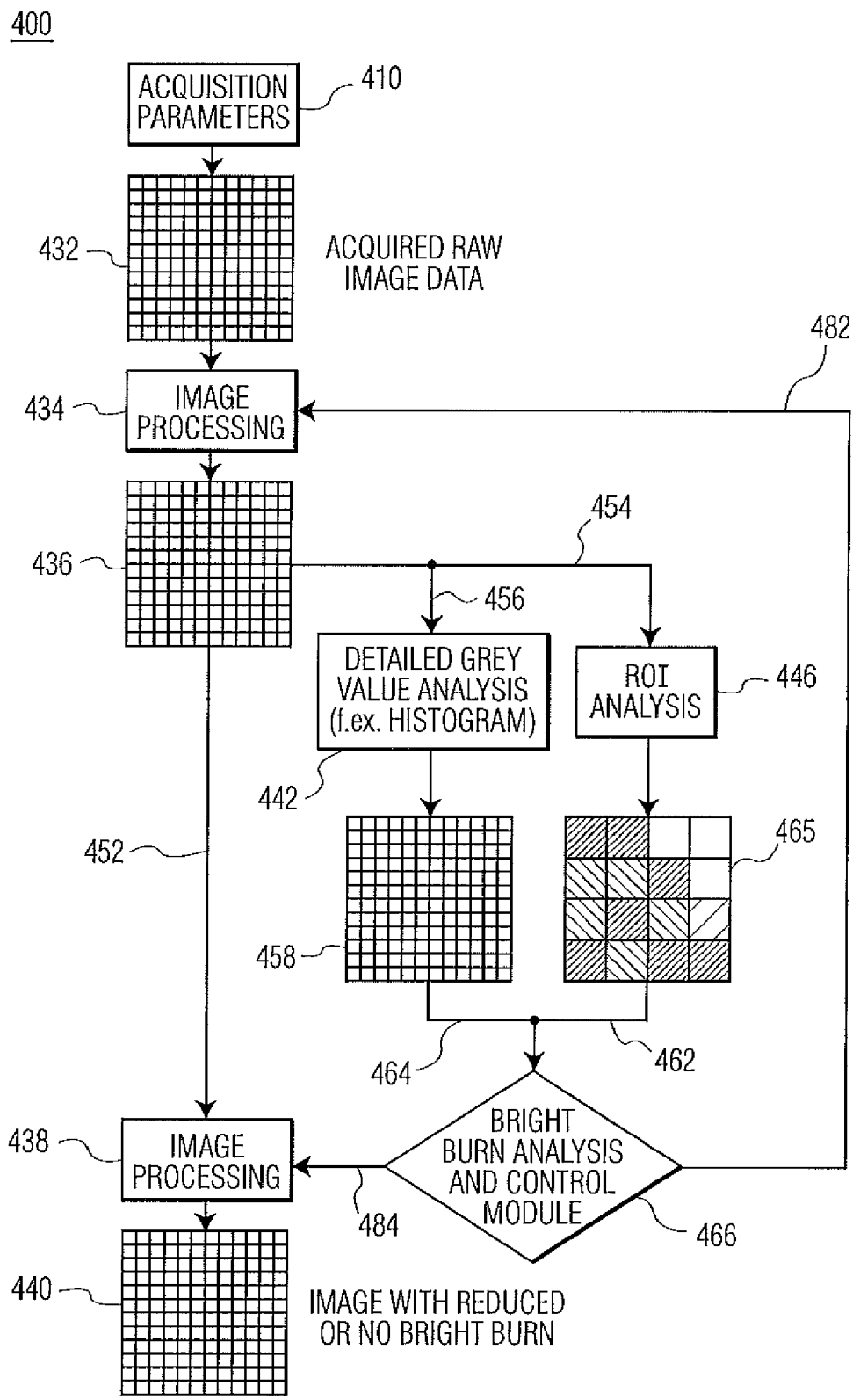
FIG. 4 shows an embodiment of the system control of the present invention to reduce bright burn using image corrections.

In another embodiment of the invention, illustrated in FIG. 4, no physical wedge filter is used. Rather, a "software wedge filter" is used to reduce bright burn areas. In this embodiment, a similar system as described in relation to FIGS. 1 and 2 may be used with the exception that the wedge filter 150 is not necessary.

FIG. 4 shows an embodiment of the present invention to reduce bright burn using image corrections that does not utilize a physical wedge filter. In this embodiment, using a "software wedge filter" to reduce the average signal gradually from the well behaved area(s) to the bright burn area(s) is desirable because shapes other than polygons may be used to circumscribe the bright burn areas. Another desirable aspect of using software wedge filters is that they act on the image data in real-time and thus have minimal time lag relative to using physical wedge filters.

Steps and image data are shown collectively as 400 in FIG. 4. The steps may be executed by a processor, or otherwise executed to perform the identified functions and the image data may be stored in one or more memories. For example, the steps of FIG. 4 may be stored on a computer-readable medium, such as ROM, RAM, EEPROM, CD, DVD, or other non-volatile memory. The image data generated may be stored in similar types of electronic media or memory.

Acquisition parameters, such as frame rate and pulse length, are acquired and stored in step 410. (This data maybe stored in a memory, such as image data memory 210, shown in FIG. 2.) Acquired raw image data 432 may be, for example, raw image data acquired from the x-ray detector (shown as element 104 in FIG. 1). Image pre-processing, shown as step 434, is typically performed on the image data 432 obtained from the x-ray detector to generate pre-processed image data 436. A detailed grey-value analysis is performed on the entire image, as shown by step 442. (Step 442 is reached via lines 454 and 456, shown in FIG. 4). For example, a histogram of the entire image, shown as element 458, may be generated, or calculated.

Region of Interest (ROI) analysis is performed, as shown by step 446 (reached by lines 454 and 458), to locate connected regions of high signal value. In order to identify bright burn areas, the image is analyzed for connected areas of reasonable size with a high average grey value signal. That is, as shown in FIG. 6, the image is subdivided into several smaller areas 460(*a*) . . . (*n*) (where "n" is the number of ROIs), and the average signal is determined within these ROI areas 460 (*a*) . . . (*n*). This aggregate ROI image, including the ROIs 460(*a*) . . . (*n*), is shown generally as element 465.

Lines 462 and 464 lead to processing step 466, which performs bright burn analysis and generates a control signal to reduce bright burn.

Each ROI area 460 has corresponding boundaries that identify, or demarcate, the dimensions of the ROI. Examples of the boundaries are shown in FIG. 6. The processing performed by step 466 includes determining the ROI area 460(*a*) and its boundary, and providing the ROI to the image reduction routine. In this step, the average signal of each ROI 460 is compared to the grey value distribution of the whole image (histogram 458). If the average signal of the ROI (generally 460) qualifies as a bright burn candidate (BBC), the ROI will be marked accordingly. The qualification may be based on thresholding or other techniques. For example, an ROI may be marked as a BBC if:

the average signal of the ROI is higher than a predetermined multiple (rational or integer) times a mean of the histogram;

the average signal of the ROI is higher than a predetermined multiple (rational or integer) times a 50% median of the histogram;

the average signal of the ROI is higher than an 80% median of the histogram and higher than a predetermined number times the 50% median of the histogram; or the average signal of the ROI is higher than a fixed threshold in the unprocessed raw data of the detector (for example, higher than a predetermined percentage of the dynamic range of the detector).

Image analysis may be performed prior to grey value processing (such as grey value re-mapping, dynamic range compression, and other image processing techniques), or it may be performed after such image processing steps.

The ROIs that have been identified, or marked, as bright burn candidates (BBCs) (e.g., 460(*a*), 460(*b*), and 460(*c*)) are then analyzed to determine if they are connected locally. In order to be connected locally, the BBCs must be sufficiently close in proximity. For example, all BBCs that are less than a predetermined distance from each other are considered connected. If several ROIs are connected, forming a larger area, and if these areas are consistent with several predefined, expected shapes of bright burn areas, the connected ROIs will be determined to be a bright burn area, and will be subject to bright burn reduction by subtracting the signal content in an adaptive manner from the area defined by the ROIs 460. Further image processing is performed in step 438 to produce final image data 440 with bright burn reduced or totally eliminated.

For example, bright burn reduction may be accomplished by the subtraction of a large kernel low pass filter which adapts the subtraction percentage to the "grey value distance" of the ROI's average signal from the 50% median of the histogram. This operation will be described in greater detail below.

Line 484 shows that the image processing step 438 may be reached following analysis step 466.

Also, lines 482 and 452 show that the output image data 440 may be generated after one or more grey value analyses (442), ROI analyses (446), and bright burn analyses (466) have been performed. Thus, the bright burn reduction may be an iterative process.

Figure 5A:
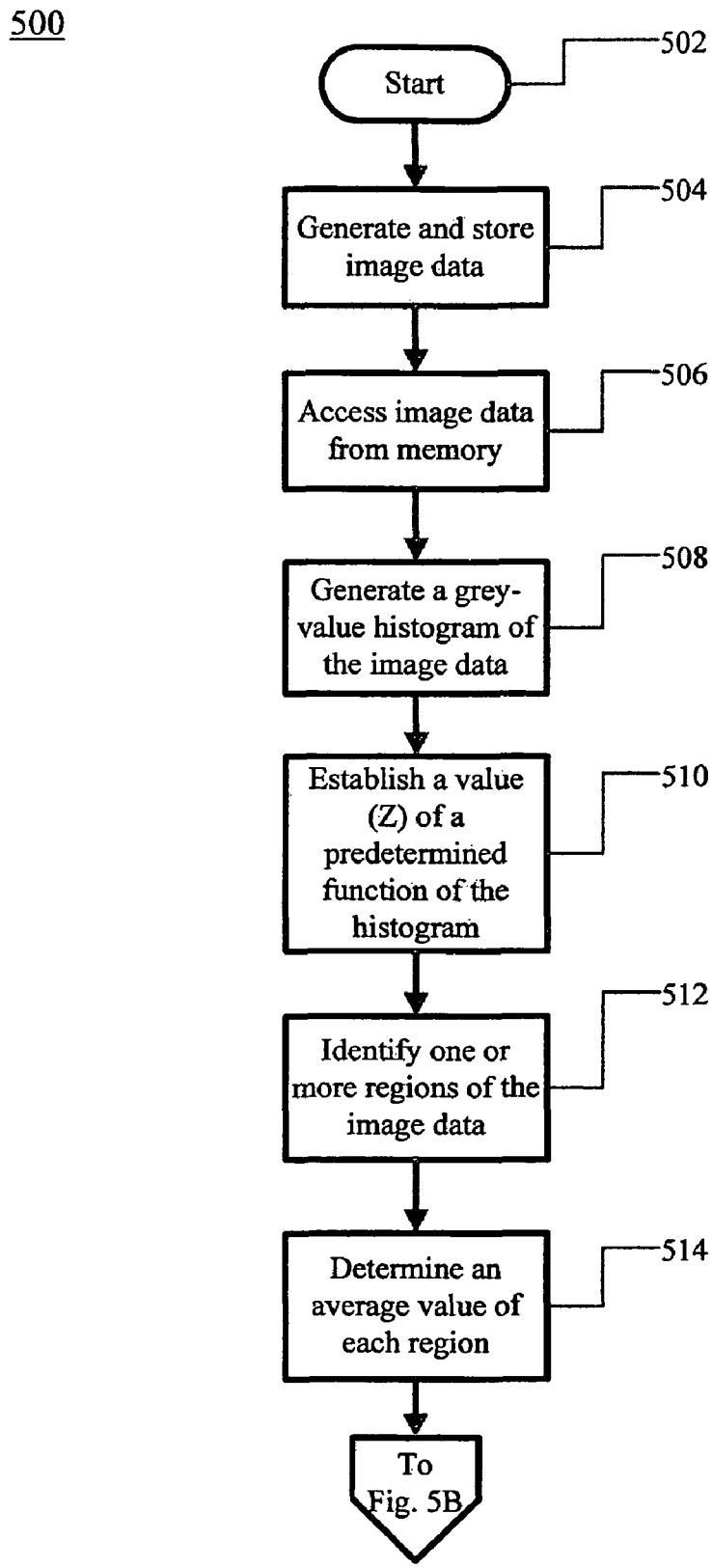
FIGS. 5A and 5B show a flowchart of steps to reduce bright burn by adjusting a wedge filter position and reducing bright burn using image corrections.
Figure 5B:
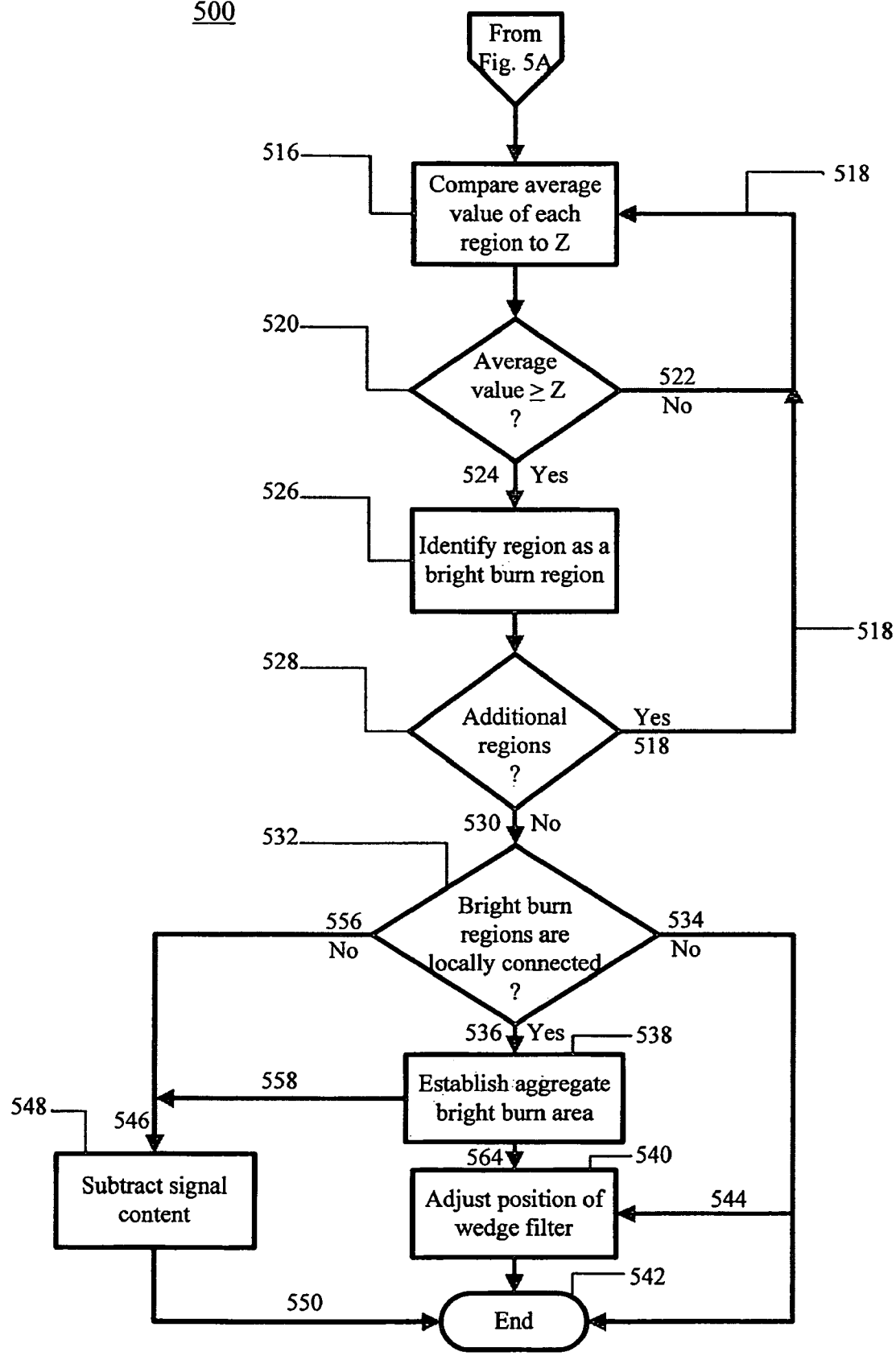

FIGS. 5A and 5B show a flowchart of steps 500 to reduce bright burn by either adjusting a physical wedge filter position or by using image corrections ("software wedge filter"). The steps 500 may be executed by a processor, or otherwise executed to perform the identified functions, and may also be stored in one or more memories. For example, the steps of FIG. 5 may be stored on a computer-readable medium, such as ROM, RAM, EEPROM, CD, DVD, or other non-volatile memory.

Step 502 is a starting step to begin a method for reducing bright burn in an image. Image data is generated, typically from an x-ray detecting device, as shown in step 504, and accessed from memory, as shown in step 506. A grey value distribution of the image data is generated, as shown in step 508.

A value of a predetermined function of the grey value distribution is generated, or calculated, as shown in step 510. This function may be, for example:

a predetermined number multiplied by a mean of the grey value distribution;

a predetermined number multiplied by approximately one-half of a median of the grey value distribution;

the greater of approximately 0.80 of a median of the grey value distribution and a predetermined number multiplied by a median of the grey value distribution; or a predetermined percentage of a dynamic range of the grey value distribution.

One or more regions of the image data are identified as Regions of Interest (ROI), as shown in step 512. A magnitude of an average signal for each of the regions is determined, as shown in step 514. This average value is compared to the value of the predetermined function of the grey value distribution, as shown in step 516. Decision step 520 determines whether the magnitude of the average value of a region exceeds the value of the predetermined function. If not, "no" line 522, via line 518, leads to step 516 in which another ROI is evaluated.

When the magnitude of the average value of the ROI exceeds the value of the predetermined function, "yes" line 524 leads to step 526, in which one or more of the regions are identified as bright burn regions. Decision step 528 determines whether there are additional ROIs; and if so, "yes" line 518 leads to step 516 in which another ROI is evaluated.

When there are no additional ROIs, "no" line 530 leads to decision step 532, in which a determination is made whether the bright burn regions are locally connected. If not, "no" line 534 leads to step 540, via line 544, and to end step 542. (Step 540 is discussed in detail below.)

When there are one or more bright burn areas locally connected, "yes" line 536 shows that an aggregate bright burn region is established. The position of a wedge filter is adjusted based on the aggregate bright burn region, as shown in step 540.

Line 544 shows that adjustment of the wedge filter may be based on individual bright burn regions, without an analysis of whether the individual bright burn regions are locally connected. The wedge filter may be adjusted by an electrical and/or mechanical control mechanism.

Alternatively, the bright burn reduction may be accomplished by image correction. As shown by "no" line 556 from decision block 532, when the bright burn regions are not locally connected, signal content is subtracted, as shown by step 548, producing a corrected image. This subtraction operation includes subtracting signal content in an adaptive manner from the one or more bright burn regions. The subtracting may also include subtracting a large kernel low pass filter from the one or more bright burn regions as described in greater detail below. Line 550 shows that end step 542 is reached. In this embodiment, image correction is performed on each bright burn region identified.

Yet another embodiment involves image correction of an aggregate bright burn region without using a physical wedge filter. This embodiment is illustrated by line 558, which follows the step of establishing aggregate bright burn regions (538), leading, via line 546, to the step of image correction performed by subtracting signal content, shown as step 548. (This step was described previously.) That is, signal content is subtracted from the aggregate bright burn region.

Subtraction Process

The subtraction process, e.g., step 548 in FIG. 5B, will now be described in greater detail. This description of the subtraction process is intended to be illustrative rather than exhaustive, and is not intended to limit the scope of the invention to the subtraction process described here. On the contrary, any subtraction process operative to subtract signal content in an adaptive manner is within the scope of the present invention. One of ordinary skill in the art will envision numerous changes, modification, alterations, additions, substitutions, and deletions from the subtraction process described here.

A simple subtraction algorithm works as follows. First, a large kernel low pass image is generated from the original image. This procedure generates an image which inherits the coarse grey-value distribution of the original image, but in which fine detail is no longer present. (The result is basically a very blurred copy of the original image). Subsequently, a given fraction of this low pass image (for example, 30%) is subtracted from the original image. This procedure will remove some of the coarse structures in the image, but preserve the fine details.

In order for the above procedure to work effectively for a bright burn area, a very high fraction of the low pass image has be subtracted from the original image (for example, 70%). However, this will not only reduce the bright burn in the image, but will also remove coarse contrast in the rest of the image where it is not required or even appreciated.

Therefore, the simple subtraction algorithm described above can be modified so that the subtracted fraction ("subtraction gain") may vary locally. While the subtraction gain is kept at zero in all ROIs that are determined to not be effected by bright burn, the subtraction gain is increased to a non-zero value in the ROIs that are identified as bright burn areas. The subtraction gain for each ROI is determined from the low pass image. This approach leads to a subtraction of the signal content in the bright-burn areas only, as required.

Different ROIs defined as bright burn areas may have different subtraction gains, depending on the average signal value in those ROIs. That is, the higher the bright burn, the higher the subtraction gain that will compensate for the bright burn effect.

The change from the well imaged areas with a subtraction gain of zero to the bright burn areas with a non-zero subtraction gain could change gradually from pixel to pixel when moving from a well imaged ROI to a bright burn ROI. In one embodiment, the subtraction gain may be considered as a two-dimensional matrix with the same dimensions as the image (for example, 1000×1000 pixels). If this results in an undesirable increase in required processing power, a "binned" version of the subtraction gain matrix may be used, for example, a subtraction gain matrix of 250×250 pixels (assuming a 4×4 binning) may be used. In that case, the subtraction gain will change every 4 pixels in the x- and y-directions.

An overall constant value may also be added to every pixel in order remove negative values that may be introduced in the subtraction process.

As will be appreciated by one of ordinary skill in the art, a "dynamic range compression" algorithm may be modified to create a subtraction algorithm. That is, a dynamic range compression algorithm may be modified to utilize a non-linear function for the pixel-by-pixel subtraction fraction of the low pass image from the original image.

Therefore, embodiments of the present invention identify one or more areas of the image data that is subject to bright burn, and reduce the bright burn either by moving a physical wedge filter into those areas or through adaptive image corrections on the image data.

It will be appreciated from the above that the invention may be implemented as computer software, which may be supplied on a storage medium or via a transmission medium as a local- or wide-area network or the Internet.

While particular embodiments are described in relation to processors and electronic memories, it is to be appreciated that multiple processors and multiple electronic memories may be used to implement all, or a portion, of the processing and storage functions of the embodiments of the present invention.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A method for reducing bright burn in an image, comprising:
    accessing image data;
    determining a grey value distribution of the image data;
    identifying one or more regions of the image data;
    determining a magnitude of an average signal for each of the regions;
    identifying one or more of the regions as bright burn regions by comparing the magnitude of the average signal of each region with a predetermined function of the grey value distribution of the image data; and
    automatically filtering a signal of the identified bright burn regions exclusive of filtering non-bright burn regions of the image to reduce bright burn in the bright burn regions.

2. The method according to claim 1, further comprising:
    evaluating a value of the predetermined function of the grey value distribution;
    comparing the magnitude of the average signal of each region to the value of the predetermined function of the grey value distribution; and
    identifying one or more of the regions as bright burn regions when the magnitude of the average signal of a region exceeds the value of the predetermined function of the grey value distribution of the image data wherein the predetermined function of the grey value distribution of the image data is a whole image histogram of the image data.

3. The method according to claim 2, wherein the predetermined function uses a predetermined number multiplied by approximately one-half of a median value of the grey value distribution.

4. The method according to claim 2, wherein the predetermined function uses the greater of approximately 0.80 of a median of the grey value distribution and a predetermined number multiplied by a median value of the grey value distribution.

5. The method according to claim 2, wherein the predetermined function uses a predetermined percentage of a dynamic range of the grey value distribution.

6. The method according to claim 1, further comprising:
    determining whether one or more bright burn regions are locally connected;
    establishing an aggregate bright burn area as a function of locally connected bright burn regions; and
    reducing bright burn in the aggregate bright burn area.

7. The method according to claim 6, wherein the step of automatically filtering a signal further comprises:
    moving a wedge filter to attenuate signal in the bright burn regions.

8. The method according to claim 6, wherein the step of automatically filtering a signal further comprises:
    adjusting a physical filter position to attenuate signal associated with the bright burn regions as a function of the aggregate bright burn region area.

9. The method according to claim 8, wherein said adjusting step is performed independent of intervention of a human operator.

10. The method according to claim 1, wherein the step of automatically filtering a signal further comprises:
    subtracting coarse grey value signal content representing the identified bright burn regions from signal content of the identified bright burn regions.

11. The method according to claim 10, wherein the subtracting includes subtracting a large kernel low pass filter from the one or more bright burn regions.

12. The method according to claim 1, wherein said grey value distribution is a histogram.

13. The method according to claim 1, wherein said one or more regions of the image data and said one or more bright burn regions are connected subsets of pixels of the entire image.

14. The method according to claim 1, further comprising:
    accessing the image data from an x-ray detector.

15. An apparatus for reducing bright burn in an image, comprising:
    means for accessing image data;
    means for determining a grey value distribution of the image data;
    means for identifying one or more regions of the image data;
    means for determining a magnitude of an average signal for each of the regions;
    means for identifying one or more of the regions as bright burn regions by comparing the magnitude of the average signal of each region with a predetermined function of the grey value distribution of the image data; and
    means for automatically filtering a signal of the identified bright burn regions exclusive of filtering non-bright burn regions of the image to reduce bright burn characteristics in the bright burn regions by adjusting a physical filter position to attenuate signal associated with the bright burn regions as a function of the aggregate bright burn region area.

16. The apparatus according to claim 15, further comprising:
    means for evaluating a value of the predetermine function of the grey value distribution;
    means for comparing the magnitude of the average signal of each region to the value of the predetermined function of the grey value distribution; and
    means for identifying one or more of the regions as bright burn regions when the magnitude of the average signal of a region exceeds the value of the predetermined function of the grey value distribution of the image data wherein the predetermined function of the grey value distribution of the image data is a whole image histogram of the image data.

17. The apparatus according to claim 16, wherein the predetermined function uses a predetermined number multiplied by approximately one-half of a median value of the grey value distribution.

18. The apparatus according to claim 16, wherein the predetermined function uses the greater of approximately 0.80 of a median of the grey value distribution and a predetermined number multiplied by a median value of the grey value distribution.

19. The apparatus according to claim 16, wherein the predetermined function uses a predetermined percentage of a dynamic range of the grey value distribution.

20. The apparatus according to claim 15, further comprising:
    means for determining whether one or more bright burn regions are locally connected;
    means for establishing an aggregate bright burn area as a function of locally connected bright burn regions; and
    means for reducing bright burn in the aggregate bright burn area.

21. The apparatus according to claim 20, further comprising:
    means for moving a wedge filter in adjusting said physical filter position.

22. The apparatus according to claim 20, further comprising:
    means for subtracting signal content in an adaptive manner from the identified bright burn regions.

23. The apparatus according to claim 15, further comprising:
    means for subtracting coarse grey value signal content representing the identified bright burn regions from signal content of the identified bright burn regions.

24. The apparatus according to claim 23, wherein the subtracting includes subtracting a large kernel low pass filter from the one or more bright burn regions.

25. The apparatus according to claim 15, wherein said grey value distribution is a histogram.

26. The apparatus according to claim 15, wherein the one or more regions of the image data and the one or more bright burn regions are connected subsets of pixels of the entire image.

27. The apparatus according to claim 15, further comprising:
    means for accessing the image data from an x-ray detector.

28. A system for reducing bright burn characteristics in image data, comprising:
    at least one memory;
    at least one processor, coupled to the at least one memory, the at least one processor adapted to execute code that performs the steps of:
    accessing image data;
    determining a grey value distribution of the image data;
    identifying one or more regions of the image data;
    determining a magnitude of an average signal for each of the regions;
    identifying one or more of the regions as bright burn regions by comparing the magnitude of the average signal of each region with a predetermined function of the grey value distribution of the image data; and
    automatically filtering a signal of the identified bright burn regions exclusive of filtering non-bright burn regions of the image by subtracting coarse grey value signal content representing the identified bright burn regions from signal content of the identified bright burn regions.

29. A method for reducing bright burn in an imaging system, comprising:
    processing an image to obtain a grey-value histogram;
    dividing the image into a plurality of regions of interest, said regions of interest representing a connected subset of pixels of the entire image;
    calculating an average signal of each region of interest;
    identifying regions of interest as bright burn candidates by comparing a function of the average signal of each region of interest with the grey-value histogram of the entire image;
    analyzing the regions of interest identified as bright burn candidates for local connectivity to estimate bright burn areas; and
    automatically filtering a signal of the identified bright burn regions exclusive of filtering non-bright burn regions of the image by adjusting a wedge filter position.

* * * * *